(12) United States Patent
Jackson

(10) Patent No.: US 8,356,721 B1
(45) Date of Patent: Jan. 22, 2013

(54) SPRING RETAINER

(75) Inventor: John M. Jackson, Constantine, MI (US)

(73) Assignee: Jackson International, Inc., Constantine, MI (US)

( * ) Notice: Subject to any disclaimer, the term of this patent is extended or adjusted under 35 U.S.C. 154(b) by 0 days.

(21) Appl. No.: 13/169,889

(22) Filed: Jun. 27, 2011

Related U.S. Application Data

(63) Continuation of application No. 12/211,490, filed on Sep. 16, 2008, now abandoned.

(60) Provisional application No. 60/973,631, filed on Sep. 19, 2007.

(51) Int. Cl.
    *F16F 1/12* (2006.01)
    *B61G 3/08* (2006.01)

(52) U.S. Cl. .............. 213/116; 213/50; 213/159; 267/3; 267/179

(58) Field of Classification Search .................. 213/50, 213/115, 116, 159–169, 211; 16/76, 78; 267/3, 4, 74, 174–179
See application file for complete search history.

(56) References Cited

U.S. PATENT DOCUMENTS

| | | | | |
|---|---|---|---|---|
| 88,625 A | * | 4/1869 | Gilfillan ............................. | 16/78 |
| 253,801 A | * | 2/1882 | Winter ........................... | 213/211 |
| 254,106 A | * | 2/1882 | Browning ....................... | 213/116 |
| 3,834,553 A | * | 9/1974 | DePenti ......................... | 213/166 |
| 4,079,842 A | * | 3/1978 | Chierici ......................... | 213/166 |
| 5,364,060 A | * | 11/1994 | Donovan et al. ............... | 248/588 |
| 6,419,211 B1 | * | 7/2002 | Hvittfeldt et al. ............... | 267/69 |
| 7,140,649 B1 | * | 11/2006 | Gregory .......................... | 292/48 |
| 2002/0105120 A1 | * | 8/2002 | Oshimo .......................... | 267/69 |

* cited by examiner

*Primary Examiner* — S. Joseph Morano
*Assistant Examiner* — Zachary Kuhfuss
(74) *Attorney, Agent, or Firm* — Botkin & Hall, LLP

(57) ABSTRACT

A spring retention device particularly well suited to use on railcars. The spring retention device has first and second fingers that oppose each other at inclined interior surfaces to define an opening. The interior surfaces overlap and are inclined relative to opposed substantially parallel and planar surfaces with which the first finger is substantially aligned between aside from its terminal end which is bent so the first finger extends outwardly from the first planar surface. The opening terminates in an enlarged portion that has an interior surface defining the perimeter of the enlarged portion. The interior surface of the enlarged portion is substantially perpendicular to the planar surfaces. Springs having eyes that have their wire bent in substantially the same plane may be inserted through the opening, then when turned to align with the enlarged portion, the spring contained therein will be prevented from backing out of the opening.

9 Claims, 8 Drawing Sheets

SPRING RETAINER

CROSS REFERENCE TO RELATED APPLICATIONS

This application in a continuation of application Ser. No. 12/211,490, filed Sep. 16, 2008 now abandoned, which claims the benefit of U.S. Provisional Application No. 60/973,631, filed Sep. 19, 2007, the disclosures of which are hereby incorporated by reference.

BACKGROUND OF THE INVENTION

Railcars releasably joined together with couplers are typically equipped with uncoupling levers that allow cars to be separated. Uncoupling levers actuate an uncoupling mechanism contained within the coupler. Since the coupler and uncoupling mechanism are located at the center of a railcar, uncoupling levers typically provide a handle near a corner of a railcar so a user does not have to place himself between railcars to uncouple them. Uncoupling levers are typically pivotally connected near a corner of a railcar. Often a railcar will have multiple uncoupling levers. To operate the uncoupling mechanism, the user will pull the handle on the uncoupling lever away from the railcar, pivot the entire uncoupling lever, thereby actuating the uncoupling mechanism in the coupler to release the coupler.

Some railcars require that their uncoupling levers be restrained by a spring. This is typically done on railcars that are inverted to be dumped, such as rotary dump coal cars. Rotary dump coal cars are held down to a section of track and then the section of track is rotated about an axis parallel to the axis of the track to invert the entire railcar and dump the contents of the railcar. While a rotary dump car is inverted, the levers could move causing the car to be uncoupled. Springs between the uncoupling lever and the railcar restrain such motion. A common practice of attaching the spring to the railcar and uncoupling lever is to use a cold shut put through a hole. Cold shut is a non reusable wire part similar to a link of chain inserted into a hole, bent shut and tack welded so an eye of a spring is captured within the cold shut. Workers may be injured when pliers used to bend cold shuts slip and hit their hands. Using cold shuts also takes time that could be saved if springs could be placed without using cold shuts.

SUMMARY OF THE INVENTION

This invention relates to a spring retention device particularly well suited to use on railcars. The spring retention device has an elongated retainer member that has opposite substantially planar surfaces. A first finger extends from the retainer member and has a first inclined interior face. The inclined interior face is inclined with respect to both the first and second planar surfaces. The first inclined interior face is adjacent to a first terminal end of the first finger. A second finger extends from the retainer member and has a second inclined interior face that is inclined with respect to the first and second planar faces. The second inclined interior face is adjacent to a second terminal end of the second finger. The second inclined interior face is oppositely spaced from the first inclined face to define an opening. The second terminal end extends longitudinally beyond the first terminal end.

In another aspect of the invention, the opening terminates in an enlarged opening. In this case, the enlarged opening extends longitudinally for a distance at least as great as that of the longitudinal distance traversed by the inclined surfaces.

DETAILED DESCRIPTION OF INVENTION

Figure 1:
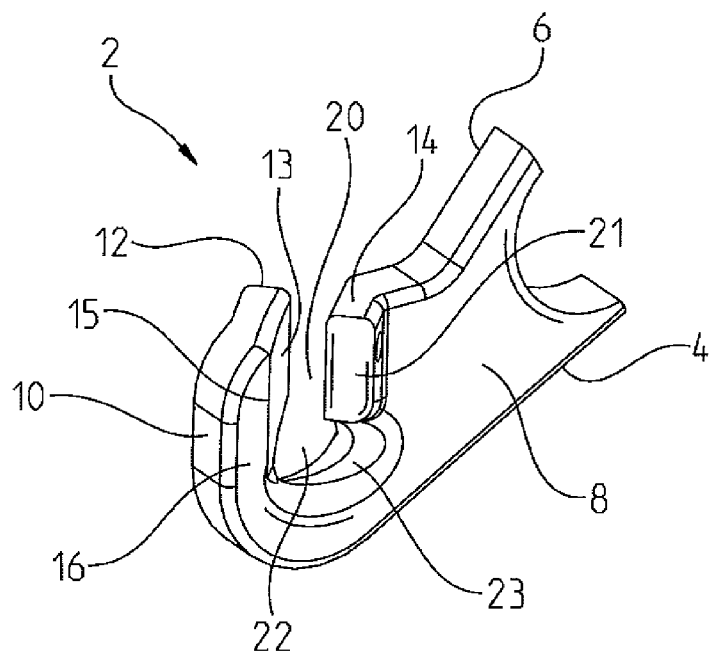
FIG. 1 is a perspective view of a retainer member.
Figure 2:
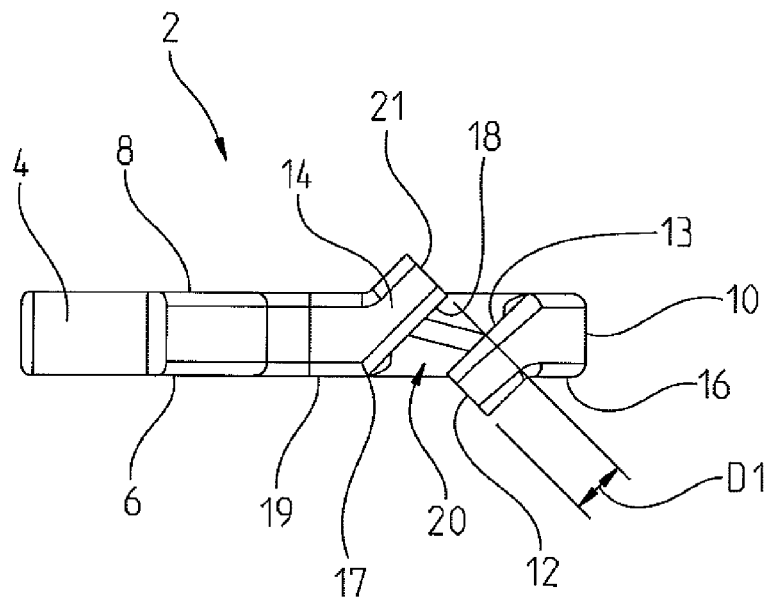
FIG. 2 is a view from above of the retainer member shown in FIG. 1.
Figure 3:
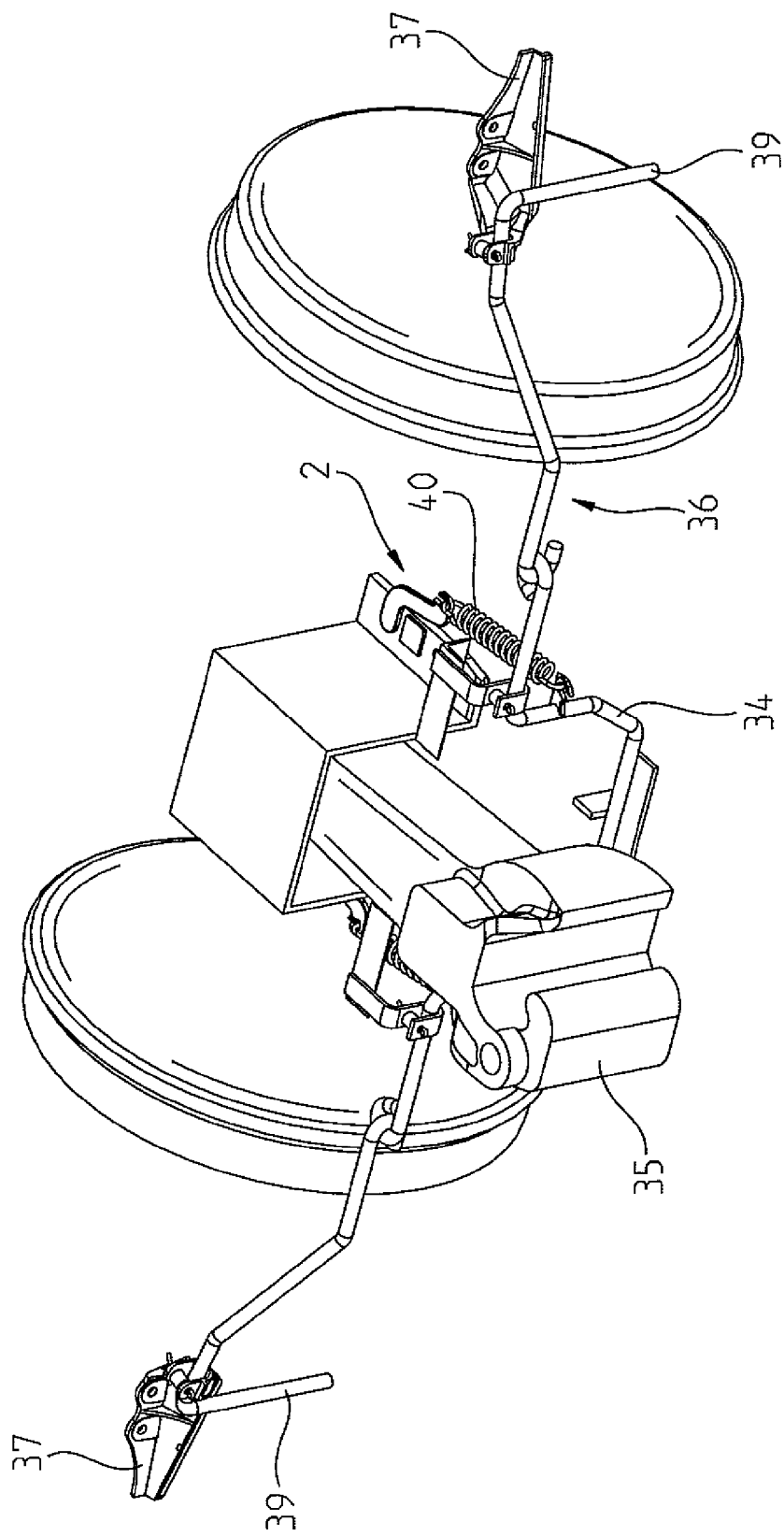
FIG. 3 is a perspective view of the retention device as it relates to components on a railcar.

This invention relates to a spring retention device 2 particularly suited for use on railcars. An elongated retainer member 4 is typically made from a rectangular piece of steel. The retainer member 4 has a first substantially planar surface 6 and a second substantially planar surface 8 that is opposite and parallel to said first planar surface 6. A first finger 10 is formed from the retainer member 4 and extends around the end of the retainer member 4, as shown in FIG. 1. The first finger 10 is an arcuate shape having a terminal end 12. The first finger 10 has an inclined interior face 13 that is inclined with respect to both the first and second planar surfaces 6, 8. The inclined interior face 13 extends from a base 15 to the terminal end 12 of the first finger 10. The base 15 is where the inclined interior face 13 intersects with an outer surface 16 opposite the terminal end 12 of the first finger 10. The outer surface 16 is coplanar with planar surface 8. A second finger 14 protrudes from the retainer member 4. The second finger 14 has a terminal end 21 and an inclined interior face 18. The inclined interior face 18 extends from a base 17 to the terminal end 21 of the second finger 14. The base 17 is where the inclined interior face 18 intersects with an outer surface 19 opposite the terminal end 21 of the second finger 14. The outer surface 19 is coplanar with planar surface 6. The first finger 10 remains substantially aligned with the planar surfaces 6 and 8 until near its terminal end 12, where it is bent so the finger 10 extends outwardly of said first planar surface 6. The second finger 14 is bent so that it extends outwardly of the second planar surface 8. The inclined interior faces 13, 18 oppose each other to define an opening 20. The first and second fingers 10, 14 and their respective interior faces 13, 18 overlap as can be seen in FIG. 3. The terminal end 12 of the first finger 10 extends beyond the terminal end 21 of the second finger 14 in a longitudinal direction. Longitudinal being left to right in FIG. 3. The fingers 10, 14 overlap in an over/under configuration. The terminal end 21 of the second finger 14 extends farther upward on the inclined interior face 13 of the first finger 10 so that for a distance D1, the inclined interior faces overlap with respect to their inclined angle. Since the inclined interior faces 13, 18 are substantially parallel, the opening 20 defined by them is inclined as well with respect to the substantially planar surfaces 6, 8. The opening 20 terminates in an enlarged portion 22. The enlarged portion 22 is as wide as the distance from the base 15 on interior face 13 to the base 17 on interior face 18. This is so that when a planar or substantially planar object is inserted into the enlarged portion 22 it will not be impeded by edges of the enlarged portion where it meets the planar surfaces 6, 8. The interior surface 23 defining the perimeter of the enlarged portion 22 is substantially perpendicular to the planar surfaces 6, 8. The overlap of the fingers 10, 14 is chosen to be great enough so an object, having passed through the opening 20, will not be able to pass from the enlarged portion 22 back out of the opening 20 if the object is turned so that it is not aligned with the opening 20. The closer in size an object passed through the opening 20 is, the more near perfect alignment it will need to be moved from the enlarged portion 22 out of the opening 20. An example of this would be a substantially planar object, or a rod being passed through the opening 20 and being turned so it is substantially perpendicular to the planar surfaces 6, 8. Such an object will not be able to pass back through the opening 20 if it is aligned perpendicularly to the planar surfaces 6, 8.

An application of the present invention is for rail car springs. Tension springs 40 have eyes 42 at each end. The eyes 42 of the springs 40 are bent with a loop of wire in a single plane, so that the wire in the eye 42 is contained between parallel opposite planes. The thickness of the eye 42, or distance between planes encompassing the wire in the eye 42 is less than the distance between the inclined interior faces 13, 18. In other words, the thickness of the eye 42 is less than the width of the opening 20. Retention of a spring 40 with an eye 42 is accomplished by inserting the eye 42 into the opening 20 and rotating it from the orientation in which it was inserted into the opening 20 once the eye 42 is in the enlarged portion 22. The rotation of the eye 42 once inside the enlarged portion 22 results in misalignment of the eye 42 with the opening 20 and thus the spring 40 will be prevented from leaving through the opening 20 when it is misaligned with the opening.

Figure 4:
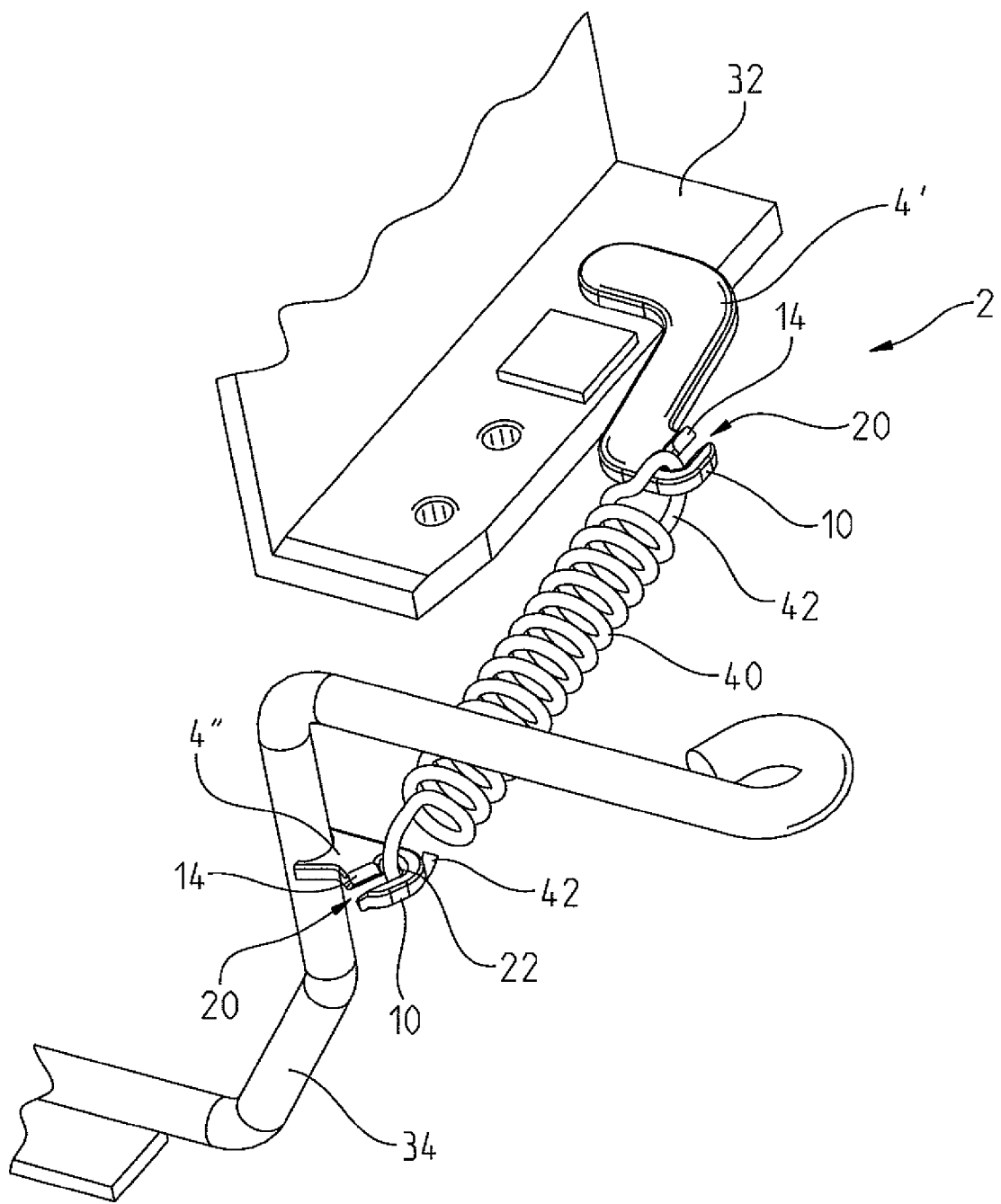
FIG. 4 is a close up view of the retention device shown in FIG. 3.
Figure 5:
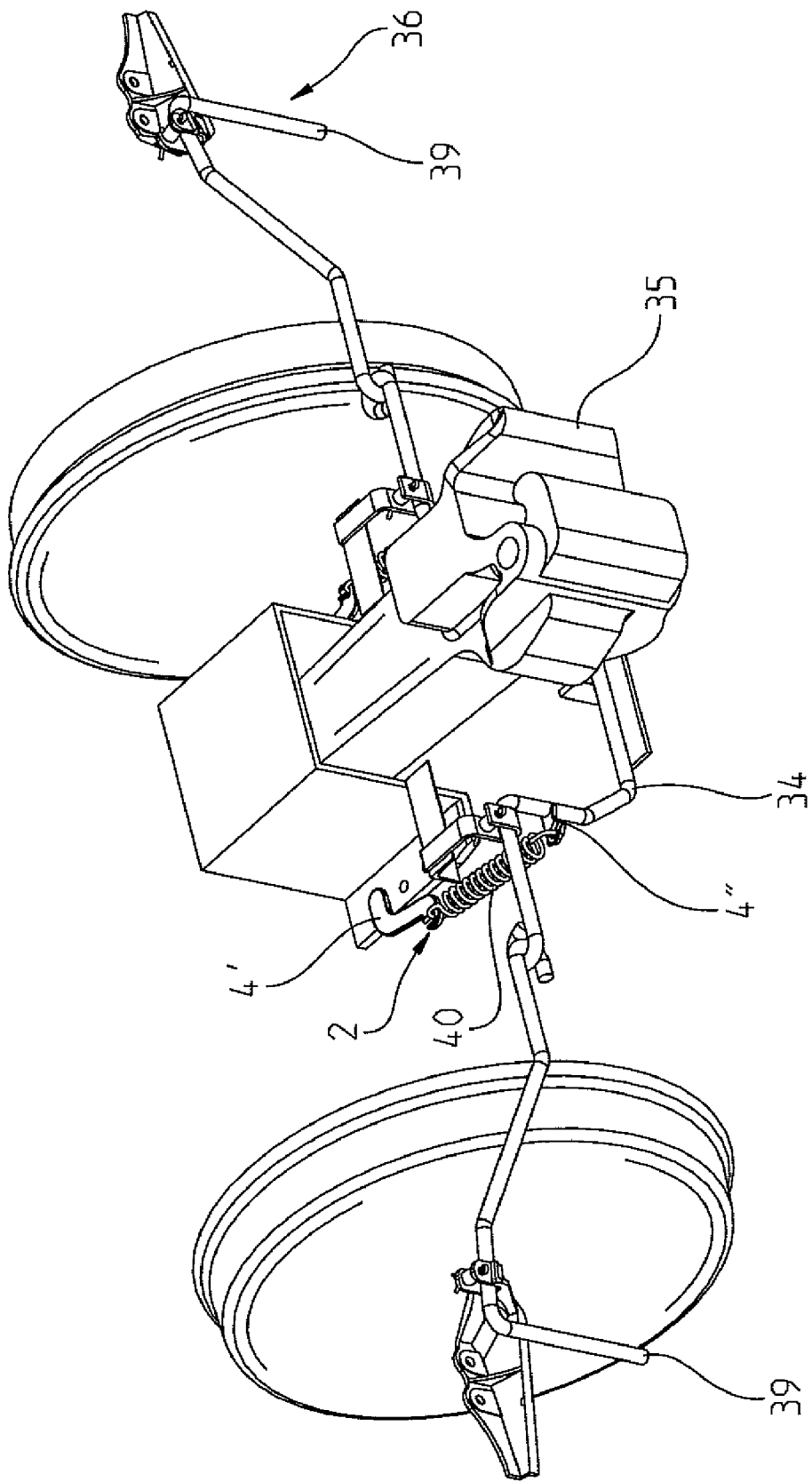
FIG. 5 shows a perspective view of another application of the retention device.
Figure 6:
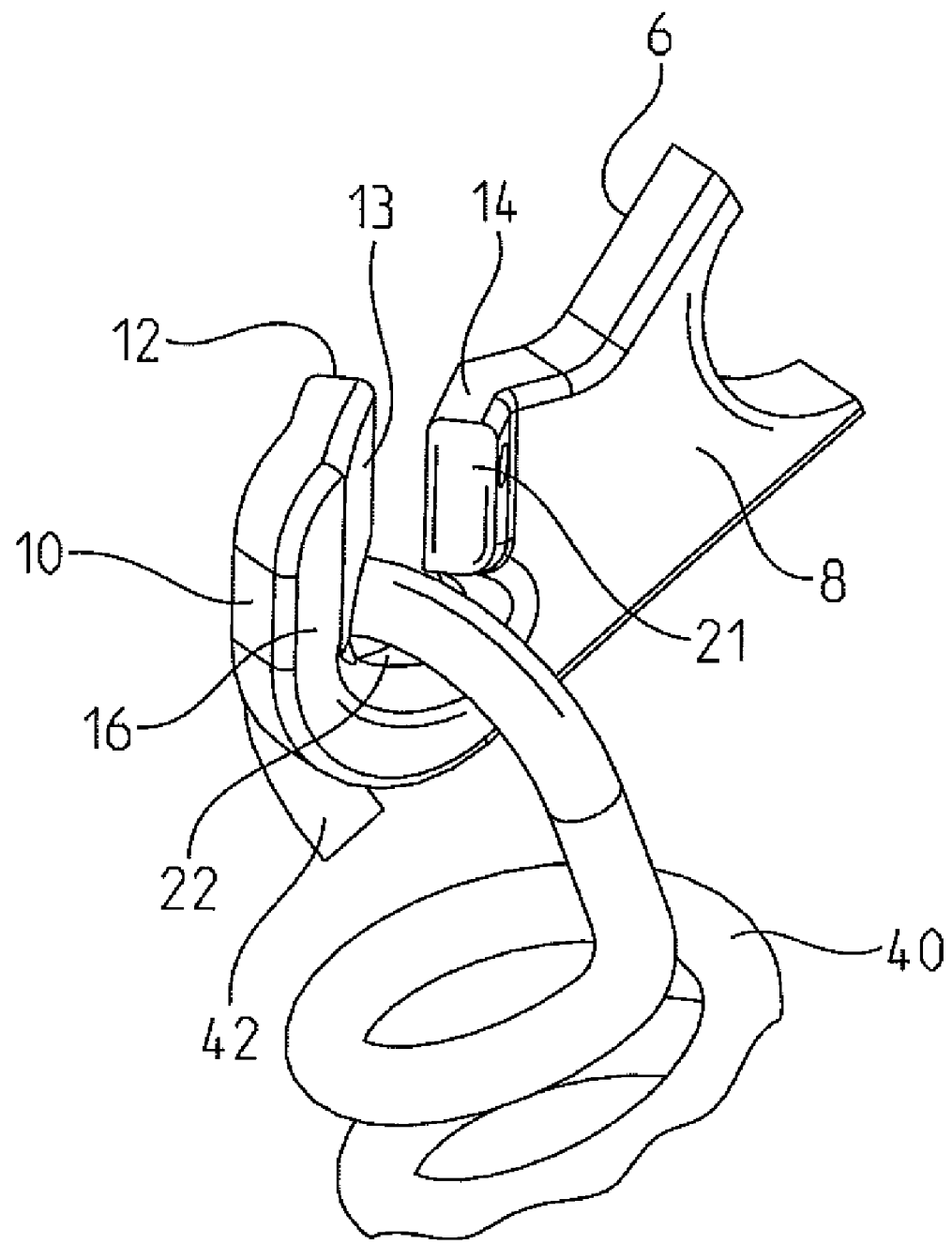
FIG. 6 shows a perspective view of a retainer member having a spring retained within the enlarged portion of the opening in the retainer member.

FIGS. 3 and 4 show an application of the spring retention device 2 to the end of a railcar. In a first application of the spring retention device 2, a first retainer member 4' is attached to a center sill 32 of a railcar. The center sill 32 is above the coupler 35. A second retainer member 4" is attached to the bail 34 part of an uncoupler lever 36. The uncoupler levers 36 are attached near the corners of a railcar by brackets 37. The brackets allow a user to pivot the handles 39 away from the railcar to move the bail 34, and thereby release the coupler 35. A tension spring 40, having eyes 42 at each end, stretches between the first and second retainer members 4', 4". The eyes 42 are received into the openings 20 of each retainer member 4', 4". FIG. 4 shows a close up view of how the eyes 42 of the springs are aligned with respect to the openings 20 on the retainers 4', 4" in the first application. The openings 20 of both retainers open at oblique angles with respect to vertical to accept the eyes 42 of the springs. Each eye 42 of the spring rests in the enlarged portion 22 of the corresponding opening 20 that retains each eye 42. The eyes 42 of the spring 40 are aligned with vertical as shown in FIG. 4. The alignment with vertical means the eyes 42 are misaligned with the openings 20. When the bail 34 is in its closest position to the railcar, and the spring 40 is in its most compressed state, there is some tension in the spring 40. The spring 40 is chosen so there is always some tension when the spring 40 is installed. The tension in the spring 40 prevents each eye 42 from leaving its location in the enlarged portion 22 of the opening 20. The tension in the spring 40 will also tend to align the eyes 42 so they are perpendicular to the planar surfaces 6, 8. Such alignment will tend to make the eyes 42 misaligned with the openings 20. Thus, the eyes 42 will remain within the enlarged portion 22 of the openings 20 without any external fasteners to block the opening 20. Thus, the spring 40 will remain between the two retainer members 4', 4".

Figure 9:
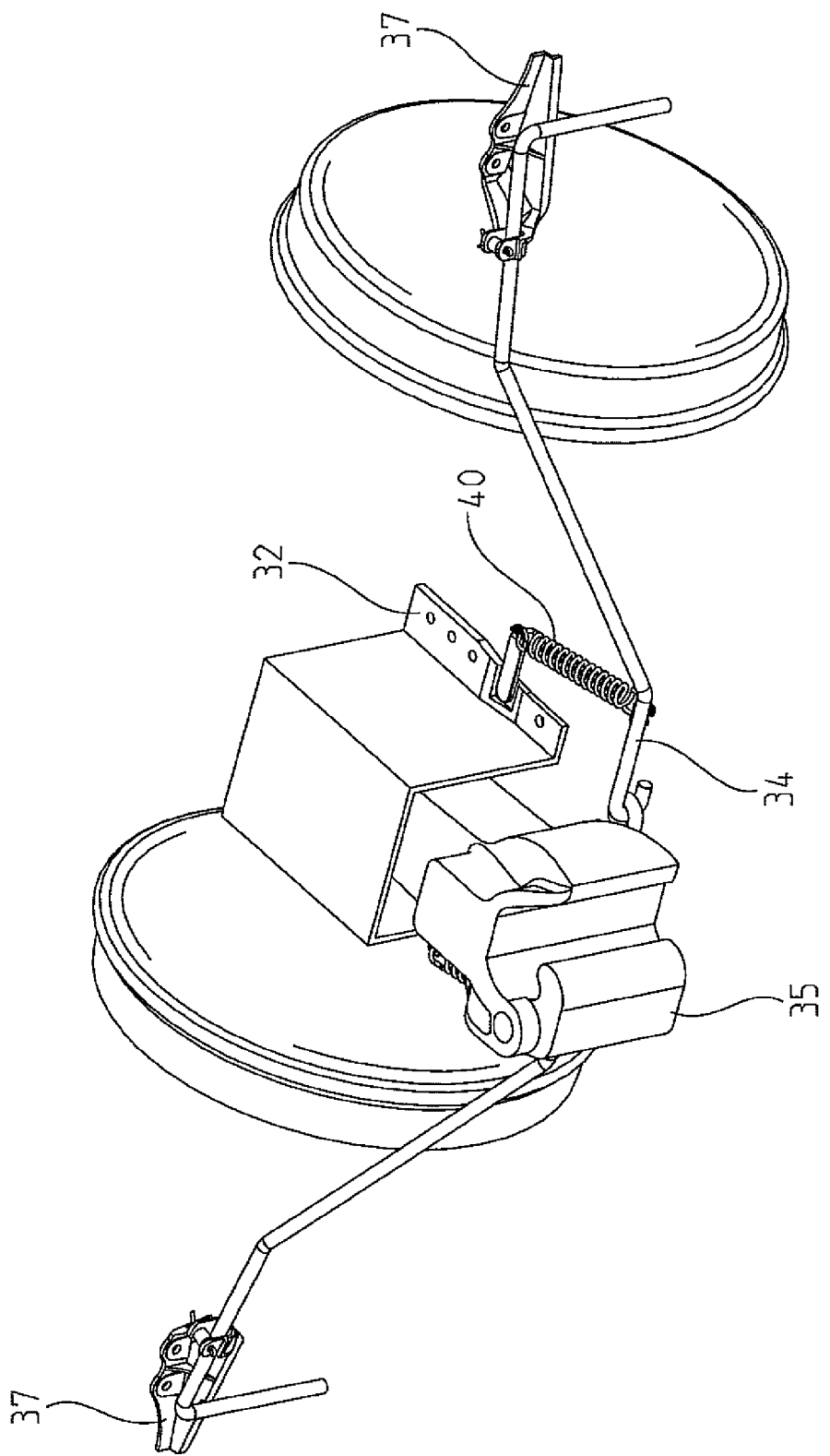
FIG. 9 is a perspective view of another embodiment of the retention device as it relates to components of a railcar.
Figure 10:
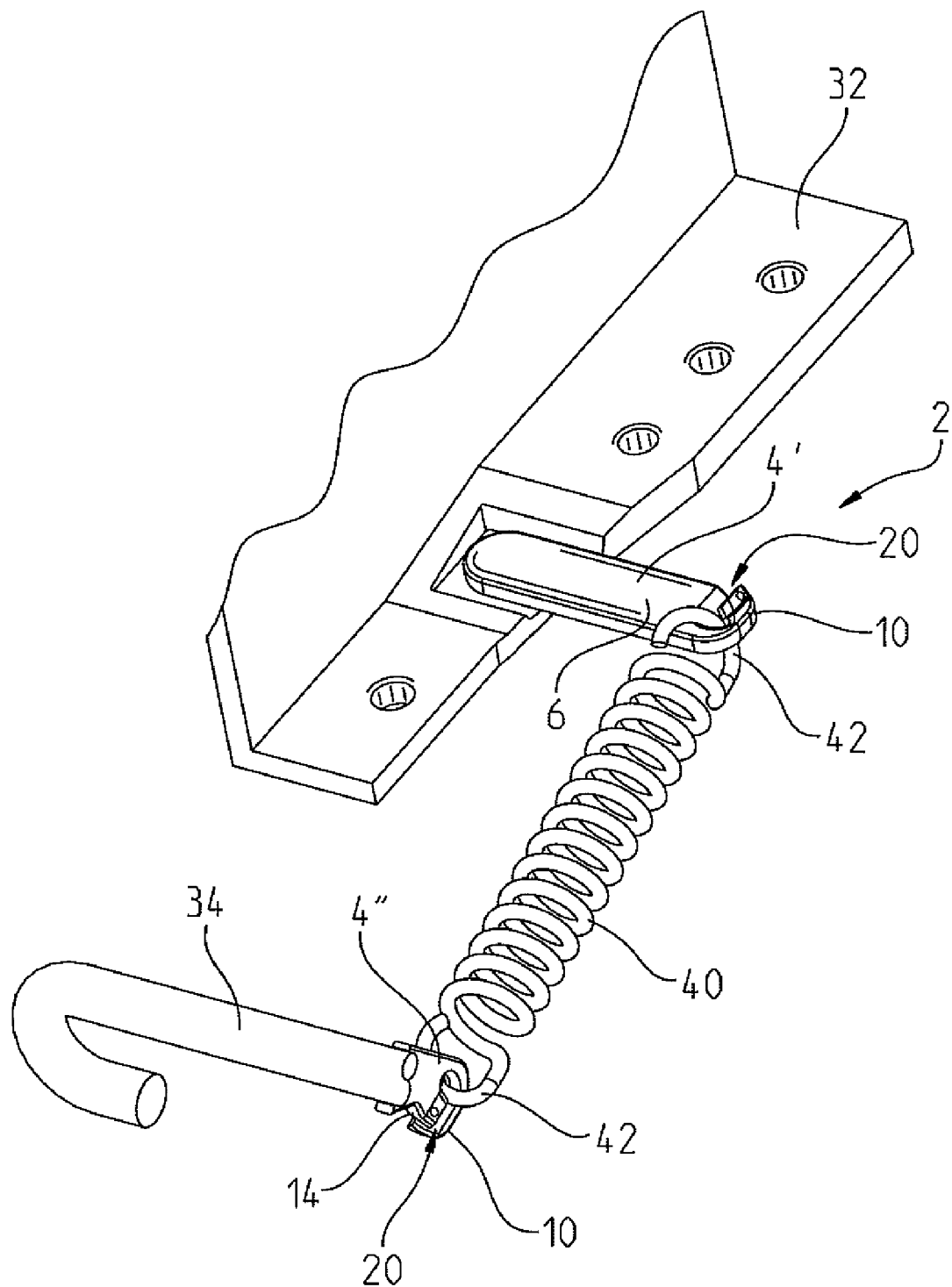
FIG. 10 is a close up view of the retention device shown in FIG. 9.

FIGS. 9 and 10 show a view of another application of the spring retention device 2. FIG. 10 is a close up view that shows the slots open in planes at ninety degrees to each other. This requires that the spring 40 be twisted to place each eye 42 within an opening 20. This also means that the spring 40 will need to be twisted to be released from the openings 20 on the retainers 4', 4". Thus, an added level of retention of the spring 40 may be provided above the level provided by the previously mentioned embodiment in which the openings 20 open approximately 180 degrees to each other.

Figure 7:
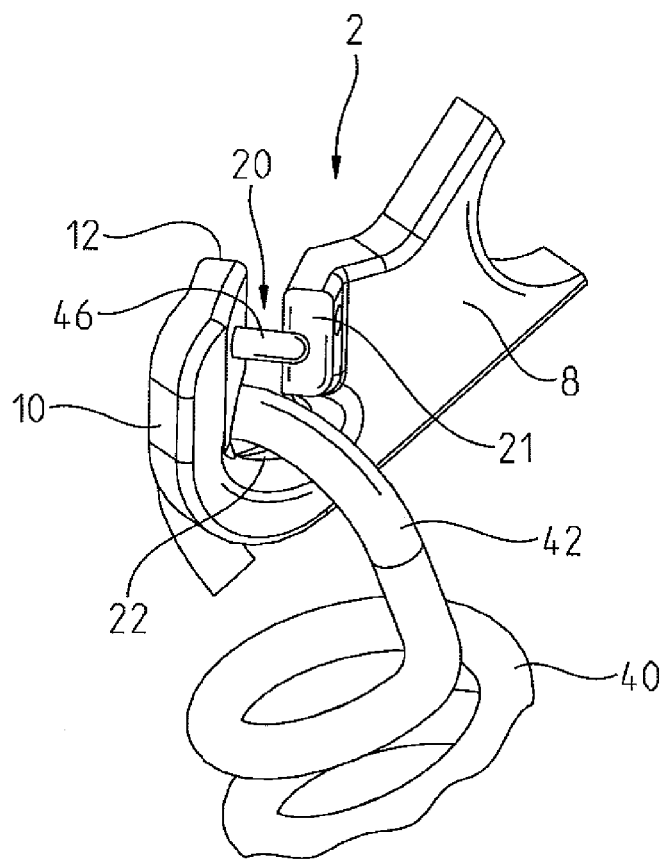
FIG. 7 shows a perspective view of a retainer member having a fastener protruding from the finger and blocking the opening.
Figure 8:
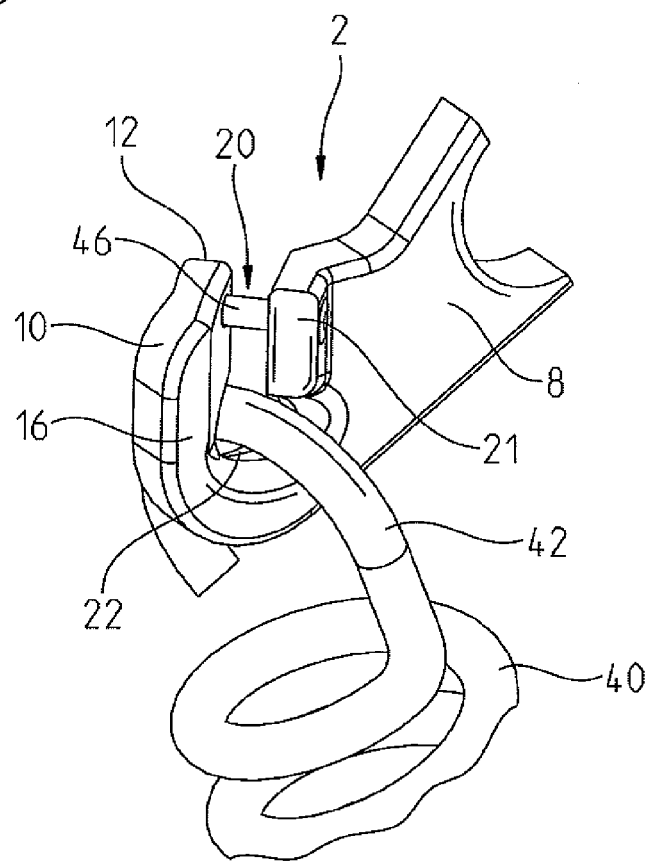
FIG. 8 shows a perspective of view of a retainer member having a fastener protruding through both the knuckle and finger to block the opening.

If even further retention of the spring 40 is needed beyond the previously mentioned embodiments, a fastener 46 may be inserted through the second finger 14 and first finger 10. This is shown in FIG. 8. The fastener 46 may be a screw, rivet, or other similar item that blocks the opening 20. Additionally, the fastener 46 need not penetrate both the finger and knuckle. FIG. 7 shows a fastener 46 protruding from the finger to form a cantilever that blocks the opening 20. While a fastener 46 is not necessary to retain the eyes 42 of the spring 40 within the openings 20, some users of the retention device 2 may desire the additional assurance of retention that a fastener 46 provides.

When a user wishes to uncouple adjacent rail cars, he will pull the uncoupler lever 36 away from the railcar. This will move the bail 34 forward and away from the center sill 32, thereby stretching the spring 40. When the bail 34 and lever 36 are in their normal resting position as shown in FIG. 3, some tension will remain in the spring 40. This tension will ensure that the eyes 42 of the spring 40 remain seated in the enlarged portions 22 of the openings 20. The eyes 42 will remain seated when the railcar is inverted even if no fasteners 46 are used.

The invention is not limited to the details given above, but may be modified within the scope of the following claims.

What is claimed is:

1. A spring retention device comprising:
   an elongated retainer member having opposite substantially planar surfaces;
   a first finger extending from said retainer member, said first finger having a first inclined interior face that is inclined with respect to both said first and second planar surfaces, said first inclined interior face adjacent to a first terminal end of said first finger;
   a second finger extending from said retainer member, said second finger having a second inclined interior face that is inclined with respect to both said first and second planar faces, said second inclined interior face is adjacent to a second terminal end of said second finger, said second inclined interior face being opposingly spaced from and adjacent to said first inclined face to define an opening, said second terminal end extending longitudinally beyond said first terminal end in an overlapping manner.

2. A spring retention device as claimed in claim 1, wherein said first finger extends outwardly from one of said planar surfaces, and said second finger extends outwardly from said other planar surface.

3. A spring retention device as claimed in claim 1, wherein said opening terminates in an enlarged portion that extends longitudinally for a distance at least that of the longitudinal distance by which the said inclined faces extend.

4. A spring retention device as claimed in claim 3, wherein said inclined interior faces extend to said terminal ends of each said finger.

5. A method of retaining a spring in a retainer comprising the steps:
   providing a spring retainer having a retainer member having opposite substantially planar surfaces, a first finger extending from said retainer member said first finger having a first inclined interior face that is inclined with respect to both said first and second planar surfaces, said first inclined interior face adjacent to a first terminal end of said first finger, a second finger extending from said retainer member, said second finger having a second inclined interior face that is inclined with respect to both said first and second planar surfaces, said second inclined interior face adjacent to a second terminal end of said second finger, said second inclined interior face being opposingly spaced from and adjacent to said first inclined surface to define an opening, said opening terminating in an enlarged portion that extends longitudinally for a distance at least that of a longitudinal distance by which the inclined surfaces extend, said second terminal end extending longitudinally beyond said first terminal end;

providing a wire spring having an eye;

aligning said eye with said opening;

inserting said eye into said opening and into said enlarged portion; and rotating said eye within said enlarged opening so that said eye is misaligned with said opening thereby retaining said spring.

6. A spring retention device comprising:

an elongated retainer member having opposite substantially planar surfaces;

a first finger extending from said retainer member, said first finger being bent away from one of said planar surfaces and extending outwardly of said one planar surface near a first terminal end of said first finger, said first finger having a first inclined interior face extending from a base to said first terminal end, said first inclined interior face being inclined with respect to said opposite planar surfaces;

a second finger extending from said retainer member, said second finger being bent away from said other planar surface and extending outwardly of said other planar surface near a second terminal end of said second finger, said second finger having a second inclined interior face extending from a base to a second terminal end, said second inclined interior face being inclined with respect to said opposite planar surfaces, said second inclined interior face being adjacent to and opposed to said first inclined interior face, said second terminal end extending beyond said first terminal end in an overlapping manner.

7. A spring retainer as claimed in claim 6, wherein said first inclined interior face extends from a first base, defined by an intersection of said first inclined interior face and an outer surface of said first finger that is substantially coplanar with said one planar surface, to said first terminal end, and said second inclined interior face extends from a second base, defined by an intersection of said second inclined interior face and another outer surface of said second finger that is substantially coplanar with said other planar surface, to said second terminal end.

8. A spring retainer as claimed in claim 7, wherein said opening terminates in an enlarged portion that extends longitudinally for a distance at least that of the longitudinal distance between said bases of said inclined faces.

9. A spring retainer as claimed in claim 8, wherein said enlarged portion includes an interior surface that defines the perimeter of said enlarged portion, said interior surface being substantially perpendicular to said opposite planar surfaces.

* * * * *